Oct. 9, 1956 M. G. KROGER 2,766,380
AUTOMATIC FREQUENCY CONTROL
Filed April 15, 1953
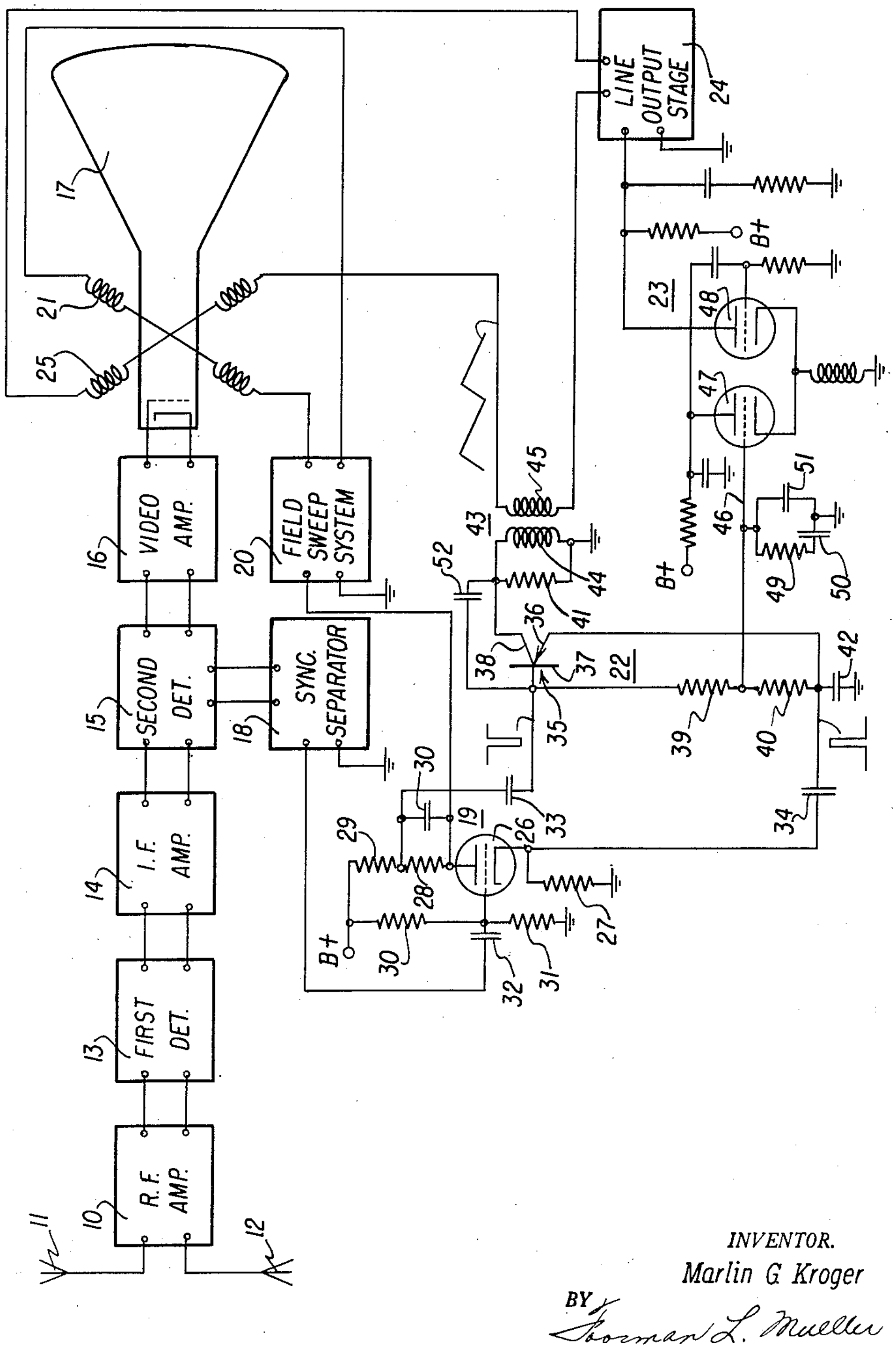
INVENTOR.
Marlin G Kroger
BY Norman L. Mueller
Atty.

United States Patent Office 2,766,380

Patented Oct. 9, 1956

2,766,380

AUTOMATIC FREQUENCY CONTROL

Marlin G. Kroger, Oak Park, Ill., assignor to Motorola, Inc., Chicago, Ill., a corporation of Illinois Application April 15, 1953, Serial No. 349,013

1 Claim. (Cl. 250—36)

The present invention relates to television receivers, and more particularly to an improved control circuit for use in a television receiver for synchronizing the deflection of the cathode-ray image reproducing device therein with the synchronizing components of incoming television signals.

It is standard practice in the television art to provide an automatic frequency control circuit in the line synchronizing system of most present-day television receivers. The control circuit is essentially a phase detector and responds to the line synchronizing components of a received television signal and to the sawtooth output wave of the line scanning generator to provide a control voltage to control the frequency and synchronize the generator with the line synchronizing components. Such a control circuit is preferred since it is relatively immune to noise disturbances so that a measure of line synchronization may be maintained even in the presence of substantial interference.

Automatic frequency control circuits of the above-mentioned type usually comprise a pair of diodes connected in balanced relation to achieve an optimum of noise immunity. For economy reasons, the double-diode type of circuit has been replaced by a simplified one using a single triode. However, most prior art circuits using a single triode are not balanced in so far as noise is concerned and do not provide the degree of noise immunity desired in commercial television receivers. The present invention is directed to a line synchronization automatic frequency control circuit of the type described above, but which uses a transistor device; and which takes advantage of certain transistor characteristics to provide a circuit possessing the balanced noise immunity of the prior art double-diode circuits, and yet which is even less complicated than the prior art triode circuits of this type.

It is, accordingly, a general object of the present invention to provide an improved and simplified automatic frequency control circuit for synchronizing a scanning generator in a television receiver with the synchronizing components of a received television signal.

A further object of the invention is to provide such an improved automatic frequency control circuit that requires a minimum of component parts and circuitry, and yet exhibits a high degree of noise immunity.

A further object of the invention is to provide such an improved automatic frequency control circuit that is highly stable in operation and which exhibits no tendency to shift the frequency of the scanning generator controlled thereby from the synchronous frequency during intervals of interruption of the synchronizing components.

A feature of the invention is the provision of an automatic frequency control circuit for controlling the frequency of a scanning generator of a television receiver that utilizes a transistor device connected in an improved manner so that the circuit is balanced in so far as noise and other disturbances are concerned, to be immune thereto and provide efficient control for the scanning generator even in the presence of such noise.

A further feature of the invention is the utilization of the bilateral conductive characteristics of a transistor in such an automatic frequency control circuit so that certain unbalancing circuit components, necessary when unilateral vacuum tubes are used, may be eliminated to further simplify the circuit and to achieve a high degree of balance to noise and other extraneous disturbances.

The above and other features of the invention which are believed to be new are set forth with particularity in the appended claim. The invention itself, however, together with further objects and advantages thereof may best be understood by reference to the accompanying drawing in which the single figure shows a television receiver incorporating the improved control circuit of the invention.

The control circuit of the present invention for synchronizing a periodic wave generator with a synchronizing wave comprises a network responsive to the aforementioned synchronizing wave for producing a positive going pulse wave and a negative-going pulse wave in phase opposition one with the other. The control circuit also comprises a transistor having a base electrode, an emitter electrode and a collector electrode. A pair of series-connected resistors of equal value is connected between the base and emitter electrodes. Means is provided for impressing the negative-going pulse wave on the base electrode, and further means is provided for impressing the positive-going pulse wave on the emitter electrode. A charging means is coupled between the emitter electrode and a point of reference potential. A network is coupled from the generator to the control circuit for deriving a periodic wave from the generator and for impressing this wave between the collector electrode and the aforesaid point of reference potential. Finally, means is coupled to the junction between the series resistors for deriving a control voltage and for supplying such control voltage to the generator to control the frequency thereof.

The television receiver illustrated in the drawing includes a radio frequency amplifier 10 of any desired number of stages having input terminals connected to an appropriate antenna 11, 12; and having output terminals connected to a first detector or converter 13. Converter 13 is coupled to an intermediate frequency amplifier 14 of any desired number of stages which, in turn, is coupled to a second detector 15. The output terminals of second detector 15 are coupled through a video amplifier 16 of one or more stages to the input electrodes of a cathode-ray image reproducing device 17.

Second detector 15 is also connected to a synchronizing signal separator 18 which, in turn, is coupled through a synchronizing signal amplifier and phase splitter 19 to a field sweep system 20. The output terminals of field sweep system 20 are connected to the field deflection elements 21 of image reproducing device 17 to control the field deflection of the cathode-ray beam therein.

Amplifier 19 is also connected to a control circuit 22, constructed in accordance with the invention, and the control circuit is coupled to a sawtooth wave scanning generator 23. Generator 23 is connected to a line output stage 24 which, in turn, is coupled to the line deflection elements 25 of cathode-ray image reproducing device 17. The sound portion of the television receiver forms no part of the present invention and, for that reason, has not been shown.

The receiver may be tuned to a television signal intercepted by antenna circuit 11, 12, and such television signal is amplified in radio frequency amplifier 10 and heterodyned to the selected intermediate frequency of the receiver in first detector 13. The resulting intermediate frequency signal is amplified in intermediate frequency amplifier 14 and demodulated in second detector 15. Second detector 15 produces a composite video signal having picture components and line and field synchronizing components, and such composite video signal is amplified in video amplifier 16 and applied to the input electrodes of image-reproducing device 17 to control the intensity of the cathode-ray beam therein in accordance with the picture intelligence.

The line and field synchronizing components of the composite video signal are separated in synchronizing signal separator 18, and are amplified in amplifier 19. The field synchronizing components are supplied to field sweep system 20 to synchronize that sweep system, and therefore the field deflection of the cathode-ray beam in reproducing device 17, with the received television signal. The line synchronizing components of amplifier 19 are utilized, in a manner to be described, to synchronize scanning generator 23 and, therefore, the line deflection of the cathode-ray beam in reproducing device 17. In this manner, reproducing device 17 is able to reproduce on its viewing screen the image intelligence of the received television signal.

Amplifier stage 19 includes an electron discharge device 26 having a cathode connected to a point of reference potential or ground through a cathode resistor 27 and having an anode connected to the positive terminal B+ of a source of unidirectional potential through a pair of series load resistors 28 and 29, resistor 28 being shunted by a capacitor 30. The control electrode of device 26 is biased in a positive direction by a connection to the common junction of a pair of resistors 30 and 31 connected as a potentiometer between the positive terminal B+ and ground, and the control electrode is coupled to separator 18 through coupling capacitor 32.

The line and field synchronizing components from separator 18 are impressed in a positive-going sense on the control electrode of device 26 and are amplified by the device. The device supplies the synchronizing components, with the field synchronizing components emphasized, to field sweep system 20 in a negative-going sense to synchronize the field sweep system in the previously described manner. In addition, the anode load circuit of device 26 supplies a negative-going pulse wave corresponding to the line synchronizing components to control circuit 22 through coupling capacitor 33, and the cathode load circuit of the device supplies a positive-going pulse wave also corresponding to the line synchronizing components through coupling capacitor 34 to the control circuit; the positive-going and negative-going pulse waves being respectively in phase and in phase opposition with the line synchronizing components from separator 18.

Control circuit 22 includes a transistor device 35 which may be of the junction or point-contact type and, in the illustrated embodiment, is a positive-negative-positive or P–N–P transistor. The transistor has an emitter electrode 36 in contact with a positive or P portion thereof, a base electrode 37 in contact with a negative or N portion thereof, and a collector electrode 38 in contact with another positive or P portion thereof.

Capacitor 33 is connected to the base electrode 37 of transistor 35 and a pair of series-connected resistors 39 and 40 is connected from the base electrode to emitter electrode 36. Capacitor 34 is connected to the emitter electrode 36, and the lower end of resistor 40 is coupled to ground through a charging means including a capacitor 42.

The control circuit includes a means for deriving a sawtooth wave from generator 23 and, in the illustrated embodiment, this means includes a transformer 43 having a secondary winding 44 (which is damped by a resistor 41) and having a primary winding 45 in series with the connection to the line deflection elements 25 of cathode-ray tube 17 from the output terminals of line output stage 24. One side of winding 44 is connected to ground, and the other side is connected to collector 38 of transistor 35 so that the line sawtooth wave may be impressed between the collector and ground.

The common junction of resistors 39 and 40 is connected by lead 46 to the control electrode of an electron discharge device 47. Discharge device 47 and a further electron discharge device 48 are connected as a well-known multi-vibrator circuit to constitute the sawtooth wave scanning generator 23. Lead 46 is coupled to ground through a filter including a resistor 49 and series capacitor 50, these two elements being shunted by a capacitor 51. Collector electrode 38 may be coupled back to base electrode 35 through a capacitor 52.

The underlying theory of operation of the control circuit 22 is not completely understood at the present time. However, it is believed that the joint action of the negative-going pulses applied to the base 37 of transistor 35 and the positive-going pulses impressed on the emitter 36, activate the transistor so that current flow between the emitter and collector 38 may be realized when the latter electrode is excited by an appropriate potential, that is, should the positive- and negative-going pulses occur at instants when the collector is driven positive by the sawtooth wave across secondary 44, current flows from the collector to the emitter due to the bilateral characteristics of the transistor; and when the aforementioned pulses occur when the collector is driven negative by the sawtooth wave, current flows from the emitter to the collector. In other words, the pulses gate the transistor to the sawtooth wave and, each time one of the positive-going and negative-going pulses occur, a current pulse flows between the emitter and collector whose direction and amplitude is determined by the polarity and amplitude of the sawtooth wave at that particular instant. These current pulses build up a potential across capacitor 42 which varies in amplitude and polarity with respect to ground as the phase between the sawtooth wave and the aforementioned pulses varies. The time-constant of capacitor 42 and circuitry associated therewith is such that the charge on the capacitor holds over between successive pulses to establish a D. C. control voltage. The positive-going and negative-going pulses applied respectively to the emitter and base electrodes of transistor 35 establish a further D. C. potential across resistors 39 and 40 due to the time-constants of the respective input circuits including capacitors 33 and 34. The circuit parameters are so chosen that a control voltage is derived at the common junction of resistors 39 and 40 which varies in amplitude and polarity with respect to ground as the phase between the sawtooth wave and the aforementioned pulses varies.

Generator 23 produces a peaked sawtooth voltage wave which is amplified in line output stage 24 to provide a sawtooth current wave in line deflection elements 25 and in the primary winding 45 of transformer 43 connected in series therewith. The sawtooth current wave in primary winding 45 produces, as previously noted, a sawtooth wave in the secondary winding 44 which is impressed between collector 38 and ground. When the scanning generator 23 is in synchronism with the line synchronizing components, the positive-going pulse wave from the cathode circuit of device 26 occurs at the instant the sawtooth wave across resistor 41 crosses the zero potential axis so that no current flows between the emitter and collector of transistor 35. However, should the frequency of generator 23 tend to vary, the phase of the sawtooth wave impressed between the collector and ground also tends to vary with respect to the negative- and positive-going pulse waves applied respectively to the base and emitter. The latter variation, as previously mentioned, causes current pulses to flow between the emitter and collector having a direction and polarity determined by such variation. These current pulses, in turn, produce corresponding variations in the amplitude and polarity of the control voltage applied to generator 23. Therefore, should the frequency of generator 23 tend to increase, the potential of lead 46 rises positively to apply the positive control voltage to generator 23 which decreases the frequency thereof and overcomes the aforementioned tendency. Likewise, should the generator 23 tend to decrease in frequency, the amplitude of the control voltage on lead 46 increases in a negative direction which tends to increase the frequency of scanning generator 23 to compensate for the last-mentioned tendency.

Since the bilateral characteristics of the transistor allow the aforementioned current pulses to flow from emitter to collector, or vice versa, depending upon the instantaneous polarity of the sawtooth wave when the aforementioned positive- and negative-going pulses occur, the simple balanced circuit of the invention may be used, that is, resistors 39 and 40 can have identical values and need not be different to compensate for unbalances in the control voltage path that occur when triodes are used in circuits of this general type.

The positive-going pulse signal and the negative-going pulse signal are applied to opposite ends of resistors 39 and 40 and, since these resistors may now have identical values, these pulses may be completely cancelled and do not appear in the output circuit of the control circuit. Moreover, any noise pulses received concurrently with the synchronizing pulses likewise appear in phase opposition in the output circuit of stage 19 and are applied with opposite polarity to the ends of resistors 39 and 40 and they too are self-cancelling across the resistors and have no material effect on the control voltage developed on lead 46. This also applies to any video frequency components translated by the synchronizing signal separator 18 and by stage 19.

The parameters of the circuit are such that there is no current flow between the emitter and collector electrodes of transistor 35 in the absence of the pulse signals from amplifier 19. Therefore, if the synchronizing wave is lost for a short interval, the control voltage on lead 46 is not subject to immediate change and there is no tendency for the circuit to draw generator 23 away from synchronous frequency during such intervals. Capacitor 52 may be coupled between collector 38 and base 35 to apply a portion of the sawtooth wave to the base which opposes the sawtooth wave on the collector and assures that there will be no current flow through the transistor in the absence of the synchronizing wave.

The values of capacitor 33 and resistors 39 and 40, and of capacitors 34, 42 and resistor 41, are so chosen that the respective networks formed thereby have selected time-constants to provide sufficiently rapid frequency control of the scanning oscillator, and yet not render the circuit susceptible to spurious biasing by excessive, high-amplitude noise pulses.

In a constructed embodiment of the invention which operated with a high degree of efficiency, the following values were used and are listed herein merely by way of an example:

Capacitor 33: 500 micro-microfarads
Resistor 39: 100 kilo ohms
Resistor 40: 100 kilo ohms
Capacitor 34: 500 micro-microfarads
Capacitor 51: .01 microfarad
Capacitor 42: .001 microfarad
Resistor 41: 10 kilo ohms
Capacitor 52: .001 microfarad
Resistor 49: 15 kilo ohms
Capacitor 50: .47 microfarad The invention provides therefore an exceedingly simple synchronizing automatic frequency control circuit using a transistor, and exhibiting essentially perfect balance to signal and noise components so that such components do not appear in its output circuit.

While a particular embodiment of the invention has been shown and described, modifications may be made, and it is intended in the appended claim to cover all such modifications that fall within the true spirit and scope of the invention.

I claim:

A control circuit for synchronizing a periodic wave generator with a synchronizing wave including in combination, means responsive to the aforesaid synchronizing wave for producing a positive-going pulse wave and a negative-going pulse wave in phase opposition one with the other; a transistor device having a base electrode, an emitter electrode, and a collector electrode; a pair of series-connected resistors of equal value connecting said base electrode to said emitter electrode; means for supplying one of the aforesaid pulse waves to said base electrode; means for supplying the other of the aforesaid pulse waves to said emitter electrode; capacitor means coupling said emitter electrode to a point of reference potential and forming the sole connection therebetween; means for deriving a periodic wave from the aforesaid generator and for applying such wave to said collector electrode whereby bi-lateral current flow is provided by said transistor device for charging said capacitor means positive and negative as said periodic wave varies with respect to said pulse wave in opposite senses; and means coupled to the common junction of said series-connected resistors for deriving a control voltage and for applying such control voltage to the generator to control the frequency thereof.

References Cited in the file of this patent

UNITED STATES PATENTS

| | | |
|---|---|---|
| 2,605,306 | Eberhard | July 29, 1952 |
| 2,620,448 | Wallace | Dec. 2, 1952 |
| 2,644,893 | Gehman | July 7, 1953 |
| 2,645,717 | Massman | July 14, 1953 |